(12) United States Patent
Beratan et al.

(10) Patent No.: US 6,361,825 B1
(45) Date of Patent: Mar. 26, 2002

(54) MICRO-BOLOMETER CELL STRUCTURE

(75) Inventors: Howard R. Beratan; Charles M. Hanson, both of Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1209 days.

(21) Appl. No.: 08/699,960

(22) Filed: Aug. 20, 1996

Related U.S. Application Data

(62) Division of application No. 08/472,166, filed on Jun. 7, 1995, now abandoned.

(51) Int. Cl.[7] .............................................. C23C 16/40
(52) U.S. Cl. ................. 427/126.1; 427/162; 427/376.2; 427/255.31; 427/255.35; 427/255.36
(58) Field of Search .......................... 427/100, 126.1, 427/372.2, 162, 376.2, 255.31, 255.35, 255.36

(56) References Cited

U.S. PATENT DOCUMENTS

| | | | | |
|---|---|---|---|---|
| 4,867,850 A | * | 9/1989 | Oka et al. ................. | 250/338.3 |
| 5,198,269 A | * | 3/1993 | Swartz et al. ............. | 427/126.3 |
| 5,272,341 A | * | 12/1993 | Micheli et al. ........... | 427/126.3 |
| 5,466,629 A | * | 11/1995 | Mihara et al. ............. | 437/947 |
| 5,536,963 A | * | 7/1996 | Polla .......................... | 257/418 |

* cited by examiner

Primary Examiner—Shrive P. Beck
Assistant Examiner—Bret B. Chen
(74) Attorney, Agent, or Firm—Wade James Brady, III; Frederick J. Telecky, Jr.

(57) ABSTRACT

A pyroelectric detector system, the pyroelectric detector element therefor and the method of making the detector element which comprises an integrated circuit (1) and a pyroelectric detector element (7) coupled to the integrated circuit and thermally isolated from the integrated circuit. The element includes a lead-containing pyroelectric layer having a pair of opposing surfaces and having a thickness to provide a resonant cavity for radiations in a predetermined frequency range. A bottom electrode (5) opaque to radiations in the predetermined frequency range is secured to one of the pair of opposing surfaces and a top electrode (9, 11) is secured to the other of the pair of opposing surfaces which is semi-transparent to radiations in the predetermined frequency range.

The top electrode is taken from the group consisting of platinum and nichrome. The lead-containing pyroelectric layer is preferably lead titanate.

15 Claims, 1 Drawing Sheet

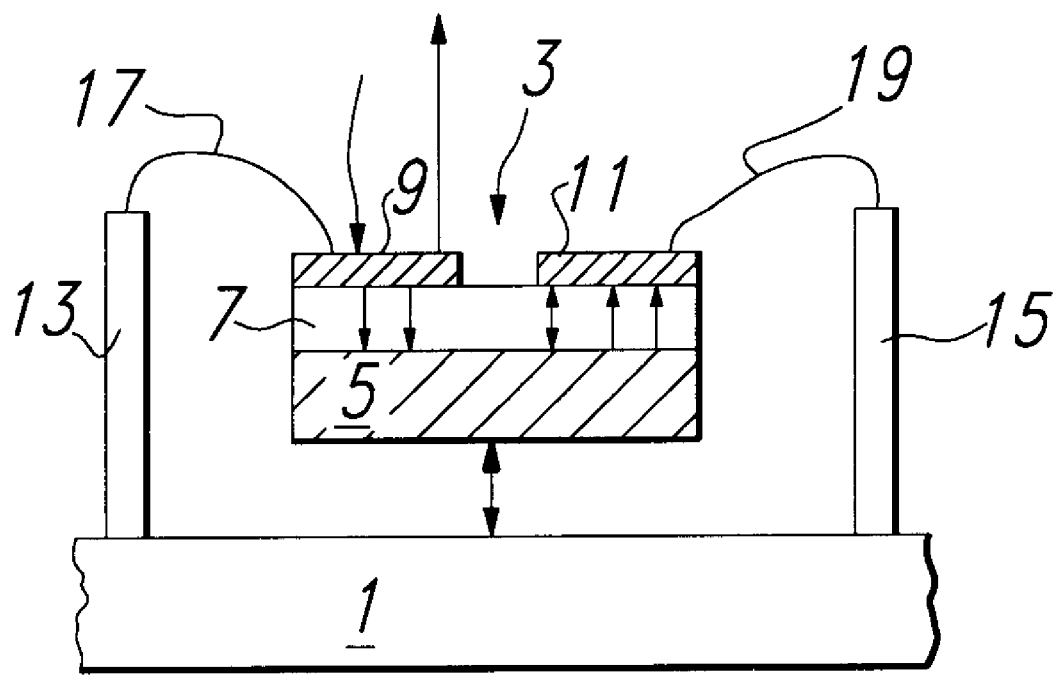

MICRO-BOLOMETER CELL STRUCTURE

This application is a Division of application Ser. No. 08/472,166, filed Jun. 7, 1995 now abandoned.

BACKGROUND OF THE INVENTION

1. Field of the Invention

This invention relates to a pyroelectric detector element for use in a pyroelectric detector system.

2. Brief Description of the Prior Art

Typically, a pyroelectric detector element can be viewed as a parallel plate capacitor having thin, on the order of 50 Å, semi-transparent top and bottom electrodes in the light frequency range of interest with a cavity between the bottom electrode of the detector element and the facing surface of an associated silicon microprocessor to which the capacitor is coupled, the cavity formed being a resonant cavity that absorbs frequencies in the wave bands of interest.

The traditional materials that are used in the fabrication of thin film pyroelectric detector elements, in general, include a pyroelectric layer disposed over an underlying semi-transparent metal electrode. The pyroelectric layer is generally formed from a lead-containing material, typically lead titanate, though any pyroelectric material that can operate as a thin film can be used, such as materials from the lead-lanthanum-zirconate-titanate (PLZT) family. The metal electrodes are generally formed of platinum, though they can also be formed of other materials, such as, for example, platinum/rhodium, lanthanum strontium cobalt oxide, ruthenium or ruthenium oxide. These pyroelectric materials require high processing temperatures in the range of about 350 to 800° C. Lead is very reactive, making it difficult to prevent reaction of the pyroelectric metal with the underlying thin film of metal, typically a platinum electrode.

The difficulty encountered with the above described prior art techniques is that the platinum electrodes are generally very thin, about 50 Å in thickness, and will tend to ball up or react with the pyroelectric element at the processing temperatures required. This problem can be minimized by use of thick electrodes since the thick electrodes will not react with the lead in the same manner as the thin electrodes as noted above. Electrode thickness is determined by its opacity in the waveband of interest, usually about 500 Å and above. However thick electrodes will not permit the incoming radiations to pass therethrough, thereby defeating operation of the pyroelectric detector element as presently known. It is therefore apparent that improved processing techniques and/or materials are highly desirable to overcome the existing problems.

SUMMARY OF THE INVENTION

In accordance with the present invention, the above described problems inherent in the prior art are minimized.

Briefly, the bottom electrode of the parallel plate capacitor is made thick, the minimum thickness depending upon the material being used. The thickness can be estimated from the electrical conductivity. For a material such as platinum, whose resistivity is 10 microohm-cm, thickness would be in excess of 50 Å and the pyroelectric element is fabricated to have a predetermined thickness such that it provides its own resonant cavity for observing radiation of interest, thereby taking the place of the resonant cavity between the pyroelectric detector and the integrated circuit of the prior art and permitting the use of a thick bottom electrode. The pyroelectric element is typically less than one-fourth of the wavelength of interest since the index of refraction of the pyroelectric element must also be taken into consideration as is well known. Therefore, typically, a pyroelectric layer of lead titanate used for observation in the 8 to 14 micron wavelength range will be about 1 μm.

A semi-transparent split electrode is provided on the opposing or top surface of the pyroelectric element which also acts as a reflector. Since the top electrode does not require heat treatment in this arrangement, the top electrode can be formed from a metal other than platinum. Also, since the top electrode can be deposited at 9 relatively low temperature, it will not react with the pyroelectric material and can be made semi-transparent to the radiation impinging thereon, thereby permitting the radiation to travel to the absorbing cavity formed in the pyroelectric element between the bottom electrode and the split electrode. The top electrode can be platinum, but it can also be formed from a material whose resistivity can be tuned to provide the proper absorption of radiation. A material such as nichrome is preferred since a thicker layer thereof can be deposited before it reflects incoming radiation due to its higher resistivity than platinum.

The bottom electrode is thick since the radiation does not pass therethrough, thereby avoiding the problems inherent in the use of a thin metal electrode as described above. The bottom electrode forms an equipotential surface. The lines of force therefore travel from one of the split electrodes to the bottom electrode and then to the other split electrode, thereby providing the effect of a pair of series connected capacitors.

The fabrication procedures involve initially securing the thick bottom electrode to the pyroelectric element at high temperature. This is accomplished by standard metal oxide chemical vapor deposition (MOCVD), metal organic decomposition (MOD), sol/gel or physical vapor deposition. Since the bottom electrode is thick, there is no problem of balling of the bottom electrode or of reaction between the bottom electrode and the pyroelectric element. The top electrode is then deposited on the opposing surface of the pyroelectric element at low temperature. Standard photolithographic techniques are used to define the split electrode. Since low temperature is being used, not only standard metals as above enumerated can be used, but, in addition, any electrode material previously eliminated due to oxide formation at high temperature which will not oxidize at the temperatures required for deposition of the top electrode are also viable candidates.

In summary, in accordance with the present invention, the thin bottom electrode of the prior art has been replaced by a thick electrode to accommodate the reactivity between the lead in the pyroelectric element and the bottom electrode. The ability to use the thick electrode is provided by forming the resonant cavity in the pyroelectric element rather than below the detector element, thereby removing the requirement that the radiations pass through the detector element to the resonant cavity and permitting use of the thick bottom electrode.

BRIEF DESCRIPTION OF THE DRAWING

The FIGURE is a schematic diagram of a pyroelectric detector system using the pyroelectric detector element in accordance with the present invention.

DESCRIPTION OF THE PREFERRED EMBODIMENT

Referring to the FIGURE, there is shown a pyroelectric detector element in accordance with the present invention in a pyroelectric detector system. The pyroelectric detector system includes an integrated circuit 1, typically a silicon microprocessor, and a pyroelectric detector element 3. The pyroelectric detector element includes a bottom platinum electrode 5 having a thickness of 500 Å coupled to a pyroelectric element 7 of lead titanate having a thickness of about 1 μm since the system is designed to absorb frequencies in the 8 to 14 micron range. A top electrode of nichrome having a resistance of about 375 ohms/square and having split elements 9 and 11 is disposed over the pyroelectric element 7 and secured thereto. The pyroelectric detector element is thermally isolated from the integrated circuit 1 such as by being suspended thereover, by being secured thereover to an aerogel or the like or in other well known manner. The electrodes 9 and 11 are coupled to posts 13 and 15 respectively via conductors 17 and 19 respectively, the posts being secured to the integrated circuit 1 and providing electrical connection between pads on the integrated circuit and the conductors 17 and 19 in standard manner.

Lines of force therefor 21 travel from split electrode 9 through the pyroelectric element 7 to the bottom electrode 5 and then to the other split electrode 11, thereby providing the effect of a pair of series connected capacitors.

The pyroelectric detector is fabricated by depositing a layer of PLZT on the opaque platinum bottom electrode. This layer may be grown by sol/gel, MOCVD, MOD or physical vapor deposition techniques, such as sputtering. Post deposition or concurrent with the deposition process, the pyroelectric film undergoes thermal processing to evolve organics, crystallize the film and stimulate grain growth. Depending upon the material composition, the thermal treatment can range from about 450 to about 700 degrees C.

Though the invention has been described with reference to a specific preferred embodiment thereof, many variations and modifications will immediately become apparent to those skilled in the art. It is therefore the intention that the appended claims be interpreted as broadly as possible in view of the prior art to include as such variations and modifications.

What is claimed is:

1. A method of making a detector element comprising the steps of:

forming a resonant cavity in a layer of pyroelectric layer of lead-lanthanum-zirconate-titanate (PLZT) by (a) providing an opaque bottom electrode of sufficient thickness to accommodate reactivity between the lead in a pyroelectric layer and the bottom electrode;

(b) depositing on said bottom electrode said pyroelectric layer consisting essentially of a layer of PLZT having organics; and (c) heating said layer of PLZT to a temperature and for a time sufficient to evolve said organics from said layer of PLZT to crystallize said layer of PLZT and to stimulate grain growth in said layer of PLZT.

2. The method of claim 1 wherein said bottom electrode is platinum.

3. The method of claim 2 wherein said step of depositing PLZT includes the step of depositing by one of sol/gel, metal oxide chemical vapor deposition (MOCVD), metal organic decomposition (MOD) or physical vapor deposition techniques.

4. The method of claim 3 wherein said step of heating said layer is concurrent with said step of depositing said layer.

5. The method of claim 4 wherein said step of heating is in the range of from about 450 to about 700 degrees C.

6. The method of claim 3 wherein said step of heating is subsequent to said step of depositing said layer.

7. The method of claim 6 wherein said step of heating is in the range of from about 450 to about 700 degrees C.

8. The method of claim 2 wherein said step of heating said layer is concurrent with said step of depositing said layer.

9. The method of claim 2 wherein said step of heating is subsequent to said step of depositing said layer.

10. The method of claim 1 wherein said step of depositing PLZT includes the step of depositing by one of sol/gel, metal oxide chemical vapor deposition (MOCVD), metal organic decomposition (MOD) or physical vapor deposition techniques.

11. The method of claim 10 wherein said step of heating said layer is concurrent with said step of depositing said layer.

12. The method of claim 10 wherein said step of heating is subsequent to said step of depositing said layer.

13. The method of claim 1 wherein said step of heating said layer is concurrent with said step of depositing said layer.

14. The method of claim 1 wherein said step of heating is subsequent to said step of depositing said layer.

15. The method of claim 1 wherein said step of heating is in the range of from about 450 to about 700 degrees C.

* * * * *